March 25, 1958 L. L. PATTEN 2,827,749
GRASS SEED HARVESTING MACHINE
Filed Oct. 26, 1954 3 Sheets-Sheet 1

INVENTOR.
LAWSON L. PATTEN
BY
McMorrow, Berman + Davidson
ATTORNEYS

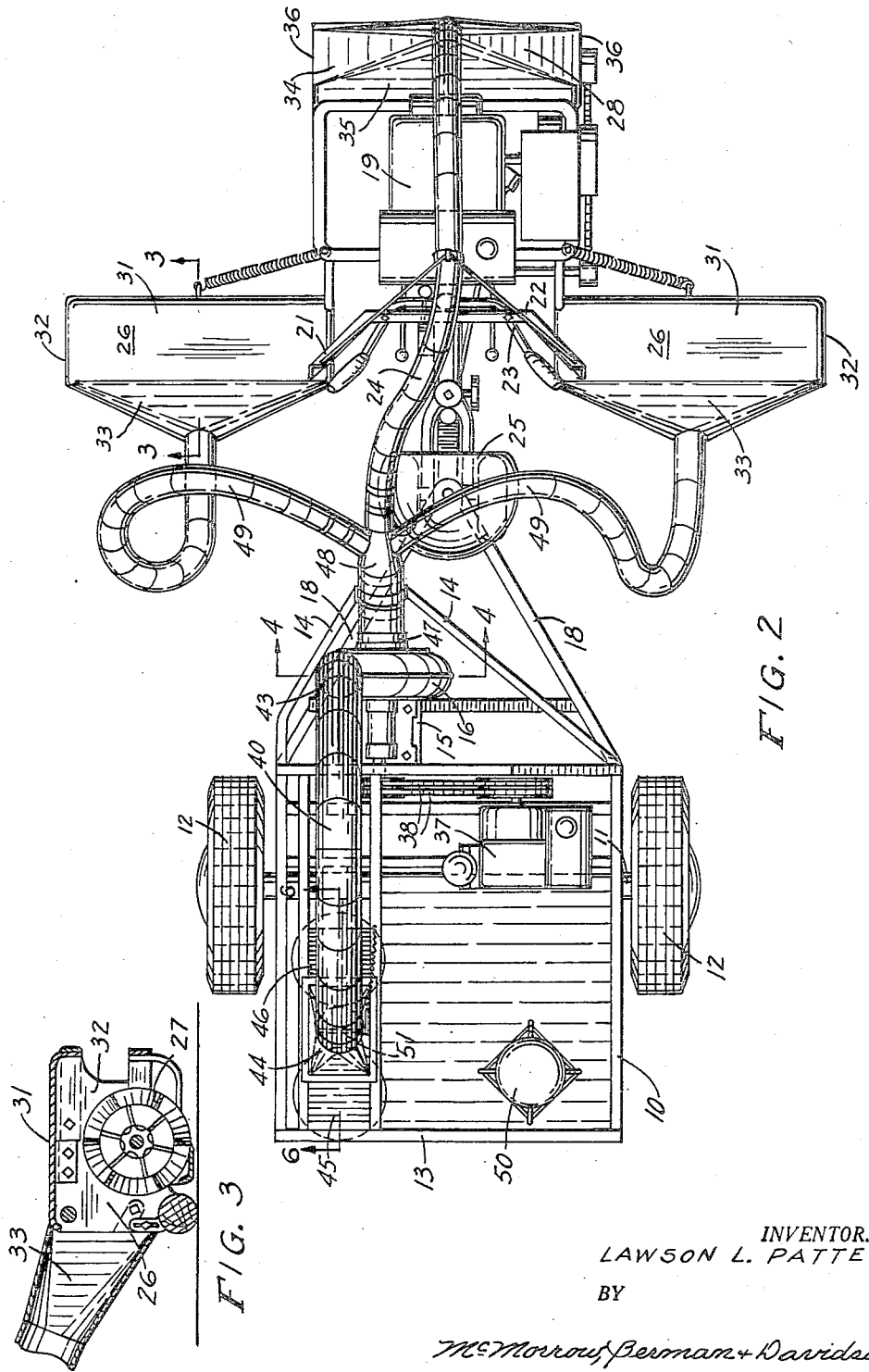

March 25, 1958 — L. L. PATTEN — 2,827,749
GRASS SEED HARVESTING MACHINE
Filed Oct. 26, 1954 — 3 Sheets-Sheet 3

INVENTOR.
LAWSON L. PATTEN
BY
McMorrow, Berman + Davidson
ATTORNEYS

United States Patent Office 2,827,749
Patented Mar. 25, 1958

2,827,749

GRASS SEED HARVESTING MACHINE

Lawson L. Patten, Lakeland, Ga.

Application October 26, 1954, Serial No. 464,718

2 Claims. (Cl. 56—128)

The present invention relates to harvesting machines for grass seed and has for its principal object to provide a new and improved machine for collecting the grass, carrying the seed as it is cut from lawns and fields where grass is grown for propagation purposes.

Another object of the present invention is to provide a mobile vehicle having pneumatic means for harvesting the grass seed after it is cut.

A further object of the present invention is to provide a machine of simple and inexpensive construction and one which may be readily assembled and hitched to a power mower of the type which has grass cutting reels.

These and other advantages of the present invention will be fully apparent upon consideration of the following description when considered in connection with the annexed drawings, in which:

Figure 2 is a top plan view of the mower in the present invention;

Figure 3 is an enlarged view in cross section on line 3—3 of Figure 2;

Figure 1:
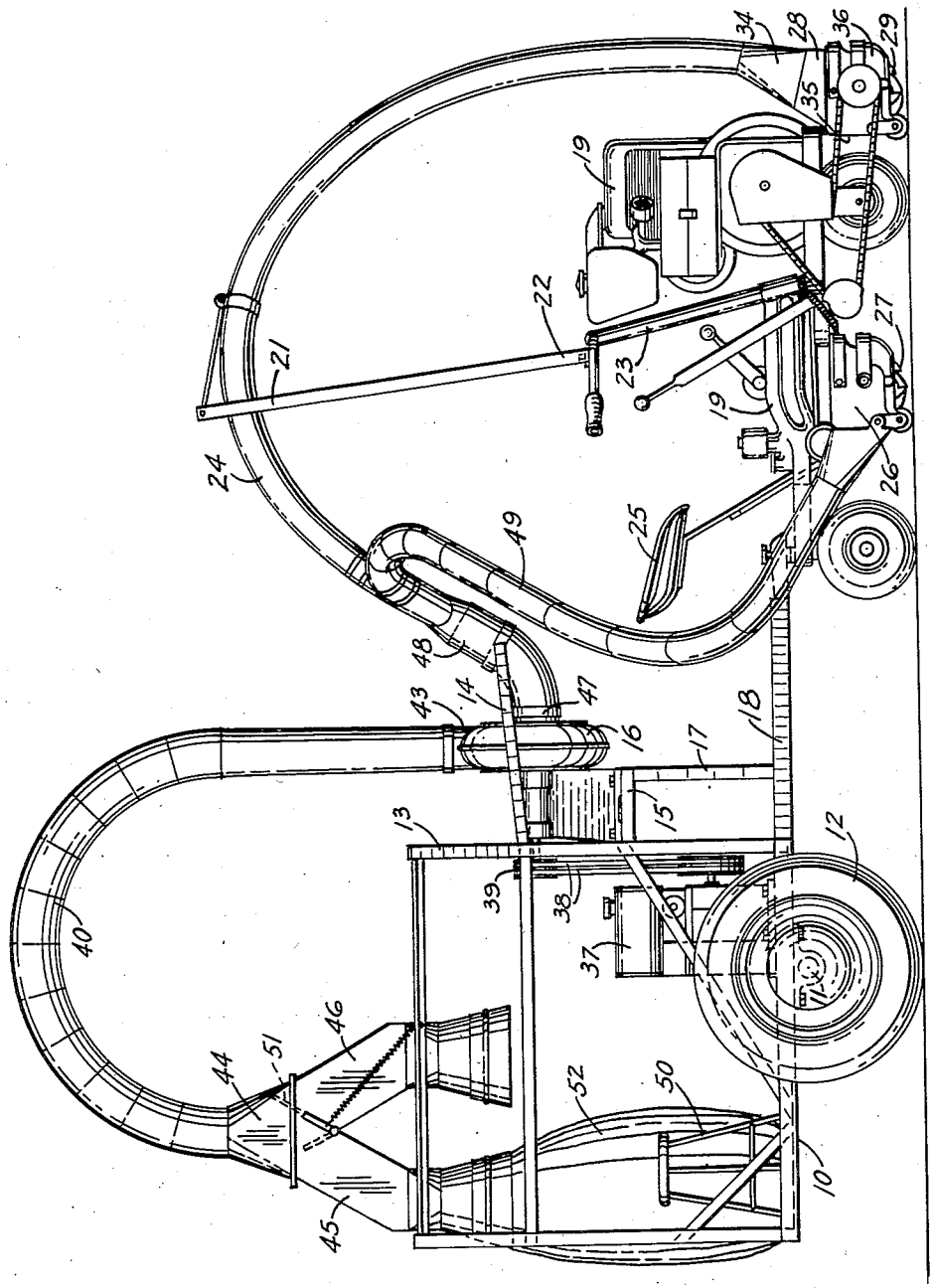
Figure 1 is a side view in elevation of the present invention connected to a power lawn mower.
Figure 4:
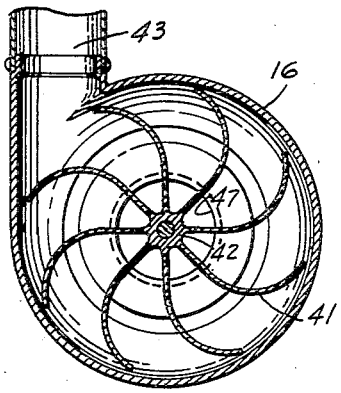
Figure 4 is an enlarged view in cross section of line 4—4 of Figure 2.
Figure 6:
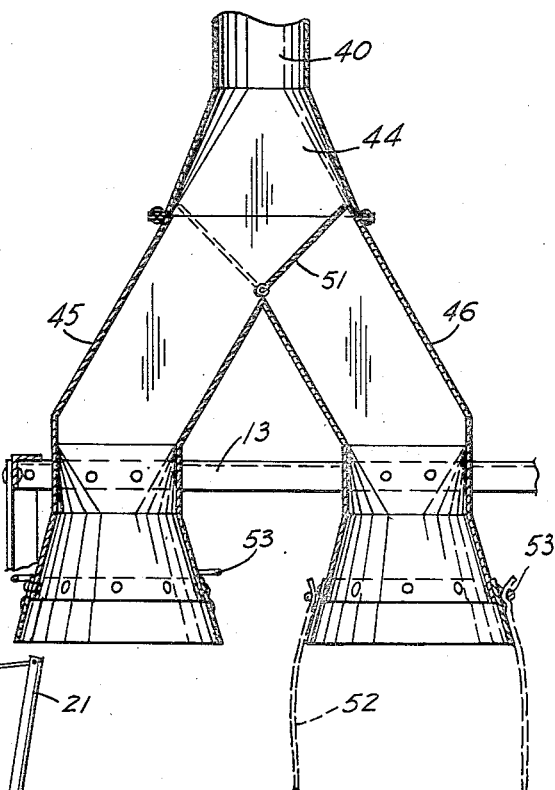
Figure 6 is a detailed enlarged view of the seed sacking discharge outlet portion of the invention.
Figure 5:
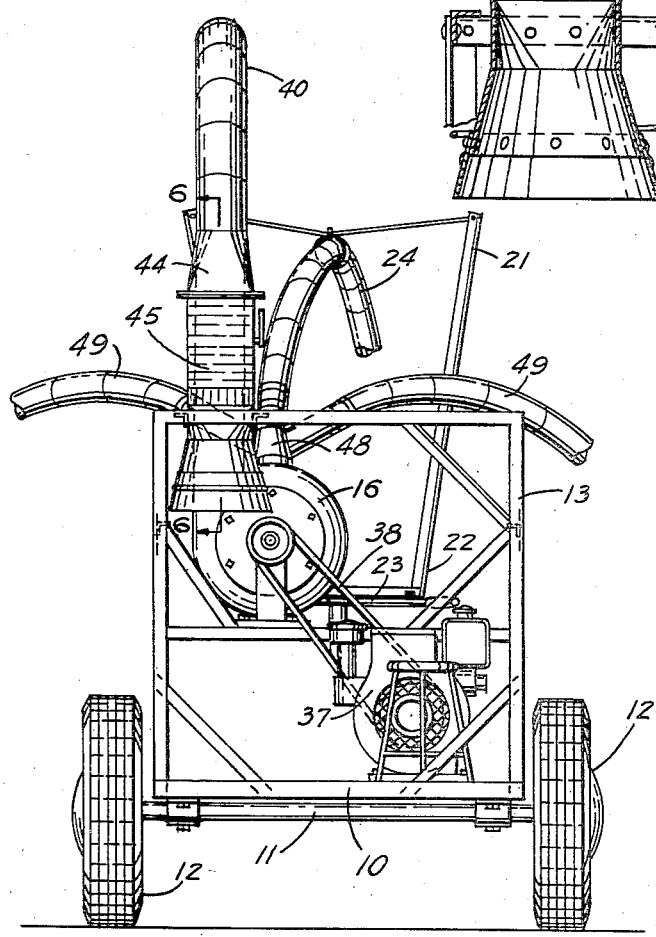
Figure 5 is a view of the rear of the present invention.

Referring in greater detail to the drawings in which like numerals indicate like parts throughout the several views, the invention consists of a mobile platform 10 supported on an exle 11 which carries a pair of wheels 12. A substantially square upstanding frame 13 extends upwardly from the platform 10 and at its forward end is provided with a forwardly projecting angle iron support 14, of V-shape.

The frame 13 also is connected to one side of a table support 15 on which is mounted a fan housing 16, the inlet end of which is secured to the angle iron support 14. The table support 15 is also supported on legs 17, the lower ends of which are welded or bolted to a V-shaped tongue 18 by means of which the platform 10 is secured for traction behind a lawn mower 19.

Secured to the lawn mower 19 is a frame 21 which extends upwardly with the lower ends of its legs 22 bolted or welded to the steering column 23 of the lawn mower in order that the tube 24 be supported in an arc over the seat 25.

A sheet metal hood 26 is secured over each of a pair of rotatable side reels 27 which are arranged in spaced transverse relation with respect to each other and positioned forwardly of the platform 10. A third metal hood 28 is secured over the front reel 29 which is arranged forwardly of and intermediate side reels 27.

The hoods 26, as seen in Figure 3, have top panels 31, side walls 32, and a rearwardly directed funnel 33, while the hood 28 on the front reel has an upwardly directed funnel 34 with a back panel 35, and end panels 36.

An engine is mounted on the platform 10 and is connected by V-belts 38 to the drive shaft 39 of the fan housing 16 within which rotates the curved blades 41 of the fan rotor 42. The outlet 43 of the fan housing 16 is connected to a tube 40 and curves to the rear to where it turns downwardly and is fitted into a distributor housing 44. Grass cuttings and grass seed attached to the grass cuttings is carried by the tube 40 from the outlet 43 of the fan housing and is distributed to either one of the discharge outlets 45 and 46.

The inlet end 47 of the fan housing where it is supported on a V-shaped angle iron support 14 is provided with a tube junction 48 to which is secured the one end of the flexible tube 24 and also two other similar tubes 49, the other ends of which are secured to the hoods 26 and 28 respectively. A seat 50 is secured for an operator and a valve 51 in the distributor housing 44 may be turned to divert the flow of grass and seed to either of the discharge outlets 45 and 46. A receptacle 52 of somewhat porous material is secured to the discharge outlet by means of a slip ring 53, and as each receptacle is filled, it is tied and pushed from the platform for later gathering and cleaning of the seed at a processing plant.

While a single embodiment of the present invention has been here illustrated and described, other embodiments are contemplated and many changes and modifications to the present invention may be made within the scope of the appended claims without departing from the spirit of the invention.

What is claimed is:

1. A harvesting machine comprising a mobile platform, a rotatable cutting reel arranged transversely of and forwardly of said platform and operatively connected thereto, a hood secured over said reel, a fan housing provided with an inlet end and an outlet end carried by said platform, a tube connecting said hood to the inlet end of said fan housing, a distributor housing provided with an outlet positioned so that the housing is spaced from said fan housing and carried by said platform, a collection receptacle mounted on said platform and adapted to be connected to the outlet of said distributor housing, and a tube connecting the outlet end of said fan housing to said distributor housing.

2. A harvesting machine comprising a mobile platform, a pair of rotatable cutting reels arranged in spaced transverse relation with respect to each other and positioned forwardly of said platform and operatively connected thereto, a third rotatable cutting reel arranged forwardly of and intermediate of said pair of reels, a hood secured over each of said reels, a fan housing provided with an inlet end and an outlet end carried by said platform, a tube connecting each of said hoods to the inlet end of said fan housing, a distributor housing provided with an outlet positioned so that the housing is spaced from said fan housing and carried by said platform, a collection receptacle mounted on said platform and adapted to be connected to the outlet of said distributor housing, and a tube connecting the outlet end of said fan housing to said distributor housing.

References Cited in the file of this patent

UNITED STATES PATENTS

| 962,780 | Nelson | June 28, 1910 |
|---|---|---|
| 2,191,135 | Roth | Feb. 20, 1940 |
| 2,207,353 | Richa | July 9, 1940 |
| 2,243,650 | Poll | May 27, 1941 |
| 2,256,219 | Ronning | Sept. 16, 1941 |
| 2,330,727 | May | Sept. 28, 1943 |
| 2,474,557 | Templeton | June 28, 1949 |